United States Patent
Brabenac

(10) Patent No.: US 7,865,752 B2
(45) Date of Patent: Jan. 4, 2011

(54) PORT-BASED PACKET FILTER

(75) Inventor: Charles L. Brabenac, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 09/746,205

(22) Filed: Dec. 22, 2000

(65) Prior Publication Data

US 2002/0083351 A1    Jun. 27, 2002

(51) Int. Cl.
*G06F 1/32* (2006.01)
(52) U.S. Cl. ...................................... 713/323
(58) Field of Classification Search ................. 713/300, 713/310, 323, 324, 330, 100; 709/230, 227
See application file for complete search history.

(56) References Cited

U.S. PATENT DOCUMENTS

| | | | | |
|---|---|---|---|---|
| 5,727,149 A | * | 3/1998 | Hirata et al. | 709/250 |
| 5,802,305 A | * | 9/1998 | McKaughan et al. | 713/310 |
| 5,835,719 A | * | 11/1998 | Gibson et al. | 709/221 |
| 5,903,566 A | * | 5/1999 | Flammer, III | 370/406 |
| 5,978,855 A | * | 11/1999 | Metz et al. | 709/249 |
| 6,182,146 B1 | * | 1/2001 | Graham-Cumming, Jr. | 709/238 |
| 6,493,824 B1 | * | 12/2002 | Novoa et al. | 713/162 |
| 6,584,122 B1 | * | 6/2003 | Matthews et al. | 370/493 |

FOREIGN PATENT DOCUMENTS

WO    WO 9916225 A1 * 4/1999

OTHER PUBLICATIONS

W. R. Stevens, "TCP/IP Illustrated, vol. 1—The Protocols", Addison Wesely, 1994, p. 226.*
*Advanced Configuration and Power Interface Specification, Revision 2.0*, Compaq Computer Corporation, Intel Corporation, Microsoft Corporation, Pheonix Technologies Ltd., Toshiba Corporation, pp. 1-92, (Jul. 27, 2000).
"Introduction to TCP/IP in Windows NT 4.0", http://msep01.eng.ohio-state.edu/lud/computer/mcse/tcp/tcpintro5.htm, pp. 1-6, (Oct. 2000).
"Network Device Class Power Management Reference Specification", *Developing for Windows Operating Systems, Version 1.0a*, http://www.microsoft.com/hwdev/specs/PMref/PMnetwork.htm, pp. 1-12, (Nov. 21, 1997).

* cited by examiner

*Primary Examiner*—Thomas Lee
*Assistant Examiner*—Eric Chang
(74) *Attorney, Agent, or Firm*—Schwegman, Lundberg & Woessner, P.A.

(57) ABSTRACT

A method, apparatus, and program product for reducing unwanted host wake-up messages. A host computer finds a port in use by a host application, selects program information based on the port in use by the application, and sends the program information to a port filter. The port filter receives a packet that contains a port identifier. The port-filter uses the program information to decide whether there is a host application associated with the port identifier and sends a wake-up message to the host computer only when there is an associated host application.

19 Claims, 4 Drawing Sheets

PORT-BASED PACKET FILTER

FIELD

This invention relates generally to communication between computers in a network and more particularly to filtering network packets based on the associated port.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © Intel, Incorporated, 2000. All Rights Reserved.

BACKGROUND

Modern computers are often connected via networks, so that they can communicate with each other and share information. The Internet is an example of one such network. Computers send information to each other on the network via packets, which are collections of related data. In some networks, source computers routinely broadcast packets to all computers attached to the network, even though the intended destination is only one computer, or perhaps a subset of the computers. In other networks, the source and destination computers are not directly connected to each other, so a packet might need to travel through multiple computers before reaching its final destination. In both of these types of networks, a computer can receive large numbers of packets for which it is not the intended destination.

Since it is inefficient for a networked computer to waste its time and energy examining large numbers of packets for which it is not the intended destination, a networked computer typically offloads this function to a network adapter, through which the computer (called the host computer) attaches to the network. It is thus the job of the network adapter to examine each received packet, determine its intended destination, and present the received packet to the adapter's host computer only if the packet is intended for it. Otherwise, the network adapter merely discards the packet or forwards it through the network.

In order to save electricity, the host computer typically enters a power-managed state when it is not receiving packets. During a power-managed state, the host computer uses less electricity by powering down or reducing electricity to selected computer components. When the network adapter detects a packet for which the host computer is the final destination, the adapter sends the host a wake-up signal, which causes the host to return to its operational working state, so that the host is capable of processing the received packet, and so that other hosts on the network can access its resources, such as web pages, files, printers, applications or services.

Unfortunately, unauthorized persons or programs (often called hackers) will probe the network to find hosts that are running applications or services that can be attacked. These hackers attempt to access the host computer by sending packets that contain the destination address of the host computer. Since the host network address matches the address in the packet, the network adapter sends the host a wake-up signal causing it to wake up, even if there are no applications or services running that can respond to the received packet. This wastes the host's time and energy and makes the host vulnerable to attack. Thus, there is a need for a solution that will protect a computer in a network from attack by unauthorized users and allow it to stay in the power-managed state until it receives a relevant packet.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
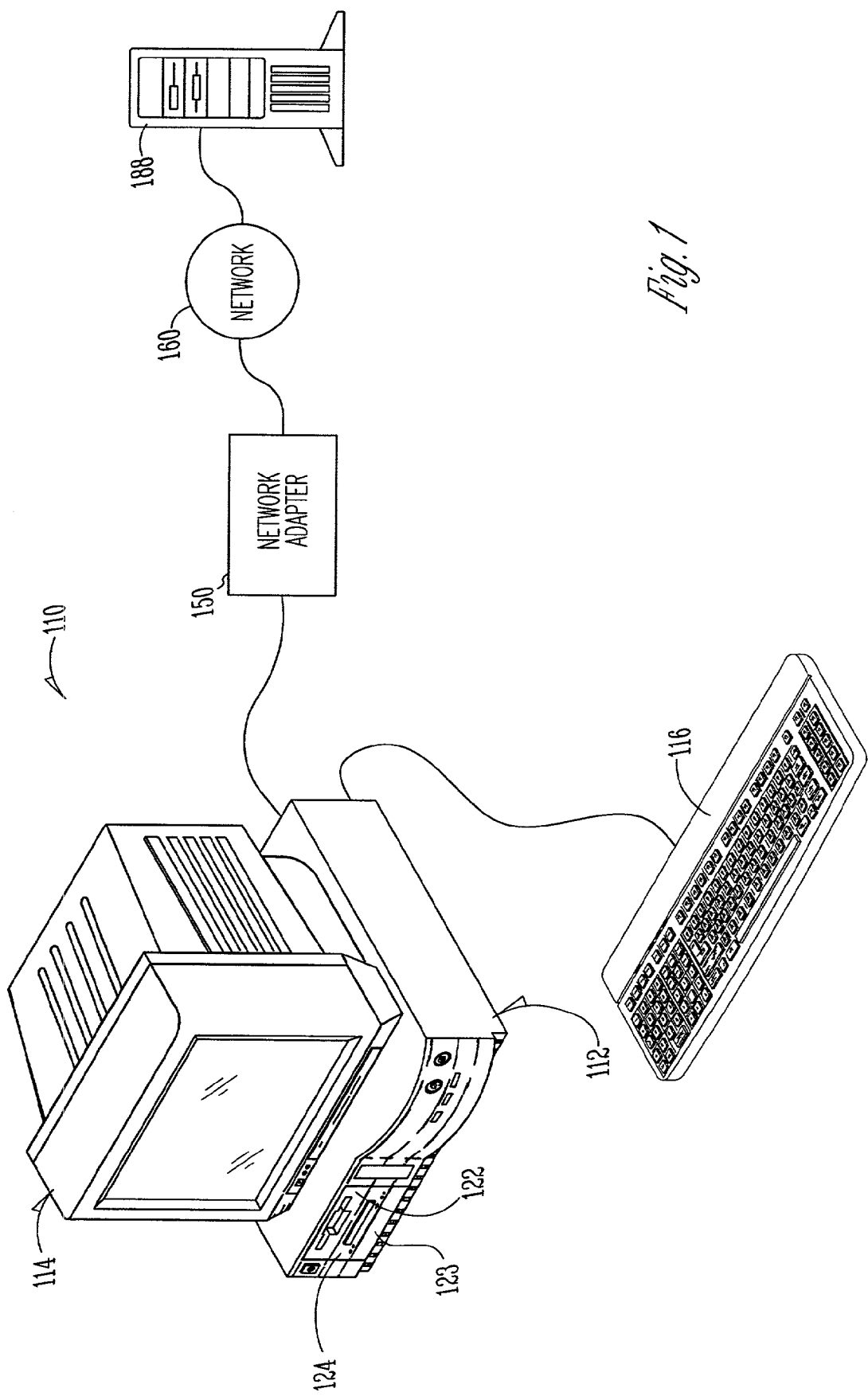
FIG. 1 depicts a pictorial example of a network of computers that can be used to implement an embodiment of the invention.

FIG. 1 depicts an example of a network of computers that can be used to implement an embodiment of the invention. Host computer 110 is connected to remote computer 188 via network adapter 150 and network 160.

Computer 110 includes processing unit 112, display device 114, and keyboard 116. Processing unit 112 receives input data from input devices such as keyboard 116 and network adapter 150 and presents output data to a user via display device 114. Processing unit 112 also sends and receives packets of information across network 160 to and from remote computer 188 via network adapter 150.

Keyboard 116 is that part of computer 110 that resembles a typewriter keyboard and that enables a user to control particular aspects of the computer.

Video-display terminal 114 is the visual output of computer 110. Video-display terminal 114 can be a cathode-ray tube (CRT) based video display well known in the art of computer hardware. But, with a portable or notebook-based computer, video display terminal 114 can be replaced with a liquid crystal display (LCD) based or gas, plasma-based, flat-panel display.

To support storage and retrieval of data, processing unit 112 further includes diskette drive 122, hard-disk drive 123, and tape drive 124, which are interconnected with other components of processing unit 112. Although diskette drive 122, hard-disk drive 123, and tape drive 124 are shown incorporated into system unit 112, in another embodiment, they can be external to system unit 112, either connected directly, on a local area network (LAN), on network 160, or attached to remote computer 188.

Diskette drive 122 and hard disk drive 123 are electromechanical devices that read from and write to magnetic disks, although any non-volatile storage devices can be, used, such as CD-ROM drives. Tape drive 124 is an electro-mechanical device that reads from and writes to tape media. The tape media is typically a long, flat piece of flexible plastic influenced to hold information recorded in digital form.

In one embodiment, the hardware of computer 110 is implemented using an IBM-compatible personal computer available from a number of vendors. But, an embodiment of the present invention can apply to any hardware configuration that allows filtering of packets, regardless of whether the computer is a complete, multi-user computer apparatus, a single-user workstation, or a network appliance that does not have non-volatile storage of its own. Computer 110 is thus a configuration that includes all functional components of a computer and its associated hardware. In general, a typical computer system includes a console or processing unit such as a processing unit 112, with one or more disk drives, a monitor such as video display terminal 114, and a keyboard such as keyboard 116, although one or more of these elements can be missing, and additional elements can be added.

Network adapter 150 facilitates communication between computer 110 and network 160, which might be a local area network (LAN), wide area network (WAN), an intranet, or the Internet. The operation of network adapter 150 is further described with reference to FIGS. 2, 4, and 5.

Remote computer 188 can be implemented using any suitable computer. Remote computer 188 sends and receives packets across network 160. Although only one remote computer is shown, in another embodiment any number of remote computers can be present.

Figure 2:
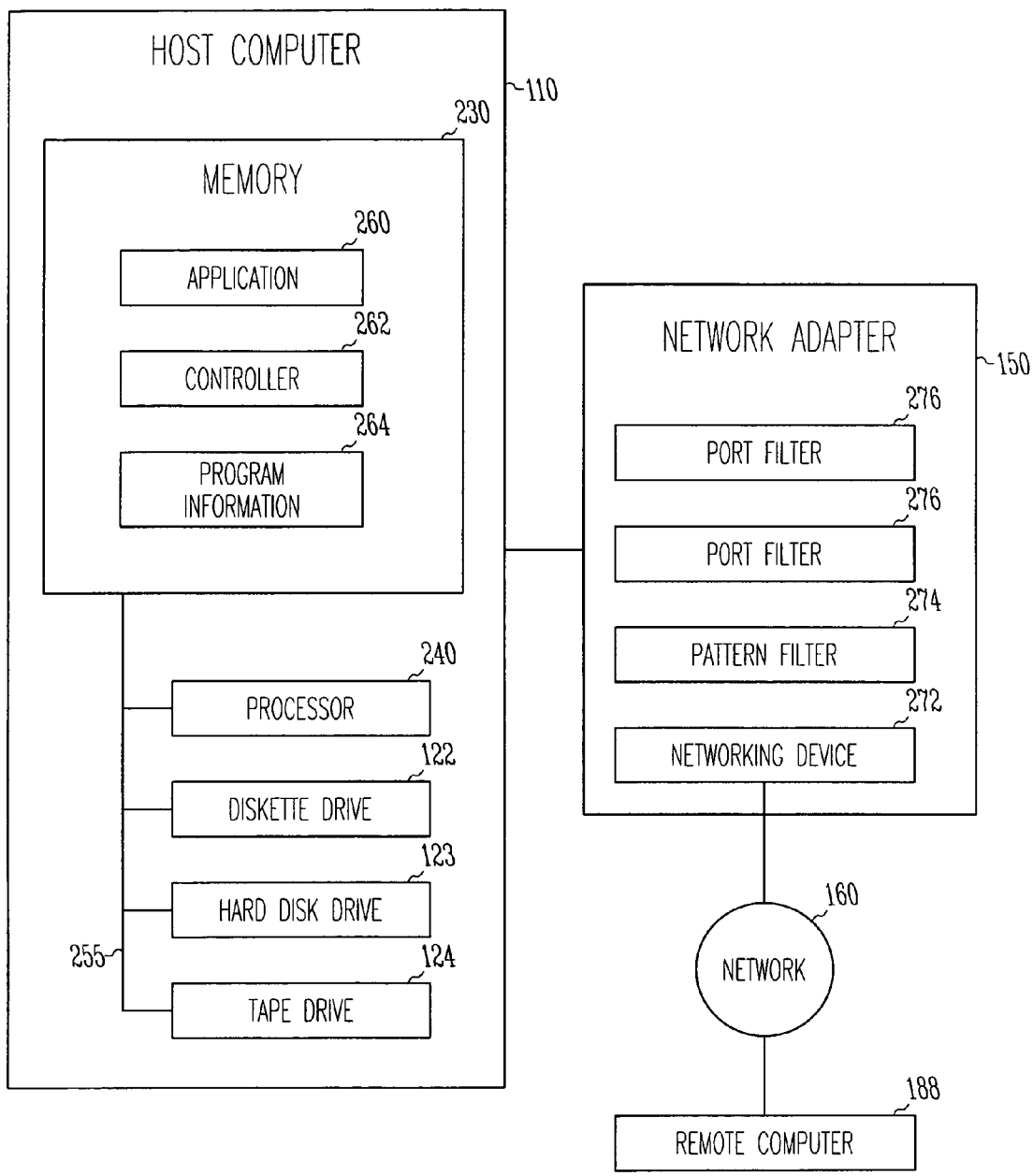
FIG. 2 depicts a block diagram of the principal components of the network of computers illustrated in FIG. 1, according to an embodiment of the invention.

FIG. 2 depicts a block diagram of the principal components of processing unit 112 of computer 110 and network adapter 150 attached via network 160 to remote computer 188. Computer 110 contains memory 230 connected via bus 255 to processor 240, diskette drive 122, hard-disk drive 123, and tape drive 124. Although the various components of FIG. 2 are drawn as single entities, each may consist of multiple entities and may exist at multiple levels.

Memory 230 comprises a number of individual, volatile-memory modules that store segments of operating system and application software while power is supplied to computer 110. The software segments are partitioned into one or more virtual memory pages that each contains a uniform number of virtual memory addresses. When the execution of software requires more pages of virtual memory than can be stored within memory 230, pages that are not currently needed are swapped with the required pages, which are stored within non-volatile storage devices 122 or 123. Memory 230 is a type of memory designed such that the location of data stored in it is independent of the content. Also, any location in memory 230 can be accessed directly without needing to start from the beginning.

Memory 230 contains application 260, controller 262, and program information 264. Application 260 is an application or service in computer 110 that is capable of being associated with a network port number. A port number identifies a logical connection to a process, such as application 260, on computer 110 and enables packets of information to be sent via network 160 to this process. Although one application 260 is shown, in another embodiment multiple applications are present. Application 260 contains instructions capable of being executed by processor 240.

Controller 262 manages the connection of application 260 to network 160 through network adapter 150 using program information 264. Controller 262 contains instructions capable of being executed by processor 240. In another embodiment, controller 262 can be implemented by control circuitry though the use of logic gates, programmable logic devices, or other hardware components in lieu of a processor-based system. The operations of controller 262 are further described with reference to FIG. 3.

Referring again to FIG. 2, program information 264 is used by controller 262 to program network adapter 150 to filter packets received from network 160. Upon receiving program information 264, network adapter 150 will send to host computer 110 only the packets that meet the criteria specified in program information 264. In one embodiment, program information 264 contains instructions capable of being executed by network adapter 150. In another embodiment, program 264 contains data identifying the port numbers of applications within computer 110. Program information 264 is further described with reference to FIGS. 3, 4, and 5.

Processor 240 executes instructions and includes that portion of host computer 110 that controls the operation of the entire computer system, including executing the arithmetical and logical functions contained in a particular computer program, such as application 260 and controller 262, in one embodiment. Although not depicted in FIG. 2, processor 240 typically includes a control unit that organizes data and program storage in a computer memory and transfers data and other information between the various part of the computer system. Processor 240 accesses data and instructions from and stores data to memory 230.

Any appropriate processor can be utilized for processor 240. Although computer 110 is shown to contain only a single processor and a single system bus, the present invention applies equally to computers that have multiple processors and to computers that have multiple buses that each performs different functions in different ways.

Network adapter 150 facilitates communication between computer 110 and network 160. Network 160 provides a user of computer 110 with a means of electronically communicating information, such as packets, with a remote computer or a network logical-storage device. In addition, in one embodiment, network 160 supports distributed processing, which enables computer 110 to share a task with other computer systems linked to the network.

Network adapter 150 contains networking device 272, pattern filter(s) 274, and port filter(s) 276. Although network adapter 150 is shown as separate from host computer 110, in another embodiment they are packaged together.

Networking device 272 sends and receives packets of information across network 160. In one embodiment, networking device 272 is a cable modem, but in other embodiments, networking device 272 can be a DSL (Digital Subscriber Line) modem, an ISDN (Integrated Services Digital Network) terminal adapter, an Ethernet interface device, or any other type of LAN, WAN, or broadband device. In one embodiment, networking device 272 supports communication between computer 110 and another computer system over a standard telephone line. In another embodiment, networking device 272 attaches to a dedicated cable. In another embodiment, through networking device 272 computer 110 can access other sources such as a server, an electronic bulletin board, and the Internet or World Wide Web.

Networking device 272 is capable of communicating across network 160 using a TCP/IP (Transmission Control Protocol/Internet Protocol) or UDP/IP (User Datagram Protocol/Internet Protocol) connection, but in other embodiments, any suitable communications protocol can be used, for example the ISO/OSI (International Organization for Standardization/Open Systems Interconnection) model.

Pattern filter 274 interrogates the packets of information that are received by networking device 272 and forwards to port filter 276 only those packets containing data in selected fields that match data associated with computer 110. Examples of the selected fields are the network address and the protocol identifier, but any appropriate field or fields can be used. All other packets are either discarded or forwarded on to their proper destination on network 160.

Port filter 276 is programmed by program information 264 to filter received packets based on port number and to present only those packets to computer 110 that contain port numbers matching the port number of application 260. Although two port filters are shown in FIG. 2, in another embodiment any number can be present corresponding to the number of applications executing on host computer 110 associated with a port number. In still another embodiment, only one port filter exists in network adapter 150, which handles all applications in host computer 110.

In one embodiment, port filter 276 is implemented via an unillustrated processor and memory, and program information 264 is downloaded from computer 110 into the port-filter memory and executed by the port-filter processor. In another embodiment, program information 264 contains data about the port numbers being used by applications 260, and this data is interpreted by instructions executing on the processor of port filter 276. In still another embodiment, port filter 276 is implemented by control circuitry though the use of logic gates, programmable logic devices, or other hardware components, and program information 264 contains data that is used by the control circuitry. The operation of port filter 276 is further described with reference to FIGS. 4 and 5.

Network 160 can include a plurality of networks, each of which can include a plurality of individual computers. In one embodiment, network 160 and remote computer 188 are located a great geographic distance from computer 110, but in another embodiment they can be in the same room or even on the same desktop. Network adapter 150 can be connected to network 160 via a standard telephone line, a dedicated cable, or a wireless communications link.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip programming devices, such as PAL or EPROM programming devices can be used in addition to or in place of the hardware already depicted. Thus, an embodiment of the invention can apply to any hardware configuration that allows filtering of packets, regardless of whether the hardware configuration is a complicated, multi-user computing apparatus, a single-user workstation, or a network appliance that does not have non-volatile storage of its own.

As will be described in detail below, aspects of an embodiment pertain to specific method elements implementable on computers. In another embodiment, the invention can be implemented as a computer program product for use with a computer. The programs defining the functions of the embodiment can be delivered to computer 110 or network adapter 150 via a variety of signal-bearing media, which include, but are not limited to:

(1) information permanently stored on non-writeable storage media (e.g., read-only memory devices within a computer such as CD-ROM disks) readable by an unillustrated CD-ROM drive;

(2) alterable information stored on writeable storage media (e.g., floppy disks within diskette drive 122, tapes within tape drive 124, or disks within hard-disk drive 123); or (3) information conveyed by a communications media, such as through a computer or telephone network including wireless communications.

Such signal-bearing media, when carrying computer-readable instructions that direct the functions of the present invention, represent embodiments of the present invention.

Figure 3:
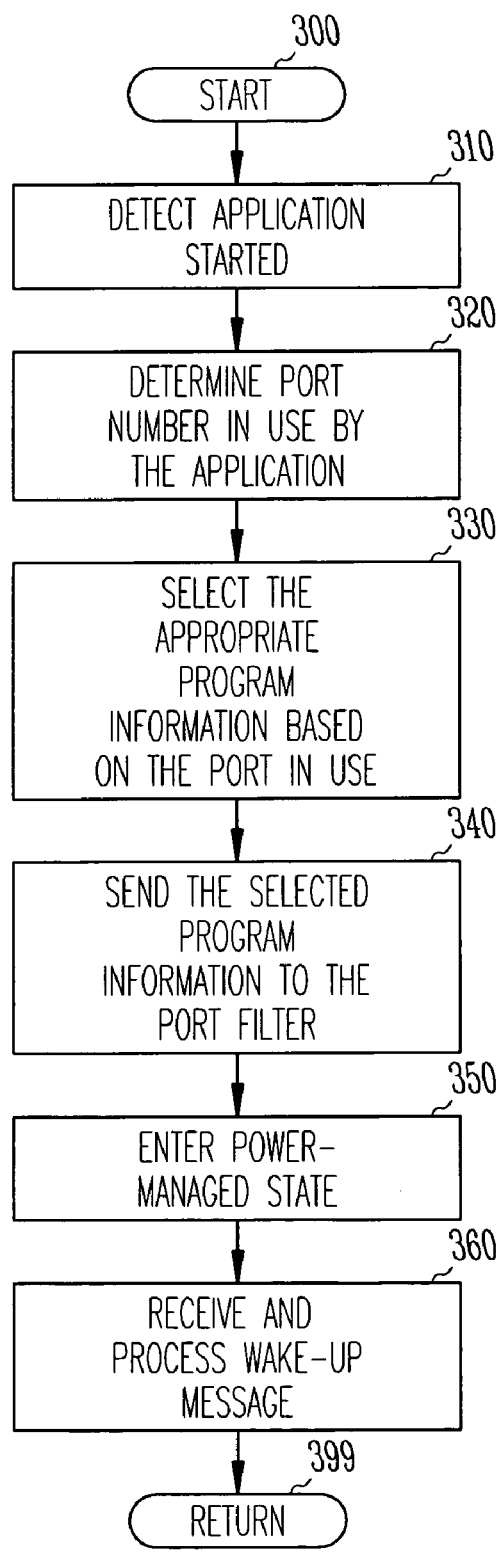
FIG. 3 depicts a flowchart that describes a method at a host computer, according to an embodiment of the invention.

FIG. 3 depicts a flowchart that describes a method at host computer 110, according to an embodiment of the invention. Control begins at block 300. Control then continues to block 310 where controller 262 detects that application 260 has been started. Control then continues to block 320 where controller 262 detects the port number associated with application 260. Control then continues to block 330 where controller 262 selects the program information 264 based on the application detected in block 310 and the port determined in block 320. In one embodiment, program information 264 includes multiple port-filter programs containing executable instructions and data, each tailored for a particular port. In another embodiment, there is only one port-filter program, which contains executable instructions and data regarding each application 260 and its associated port number. In still another embodiment, program information 264 contains data regarding the applications and port numbers, but program information 264 does not contain executable instructions.

Control then continues to block 340 where controller 262 sends the program information selected at block 330 to port filter 276. Control then continues to block 350 where controller 262 causes computer 110 to enter a power-managed state when there are no received packets. During a power-managed state, computer 110 consumes a reduced amount of power. Control then continues to block 360 where controller 262 receives a wake-up signal from network adapter 150 and in response changes computer 110 from its power-managed state to its normal, operating state. Control then continues to block 399 where the function returns.

Figure 4:
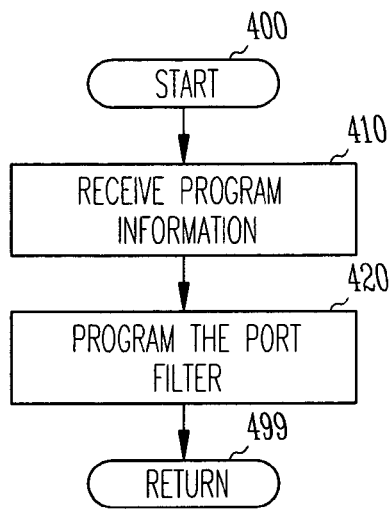
FIG. 4 depicts a flowchart that describes a method at a port filter, according to an embodiment of the invention.

FIG. 4 depicts a flowchart that describes a method at port filter 276, according to an embodiment of the invention. Control begins at block 400. Control then continues to block 410 where port filter 276 receives program information 264 from host computer 110. Control then continues to block 420 where, in one embodiment, port filter 276 initializes its functions with the data of program information 264. In another embodiment, port filter 276 loads the executable instructions of program information 264. Control then continues to block 499 where the function returns.

Figure 5:
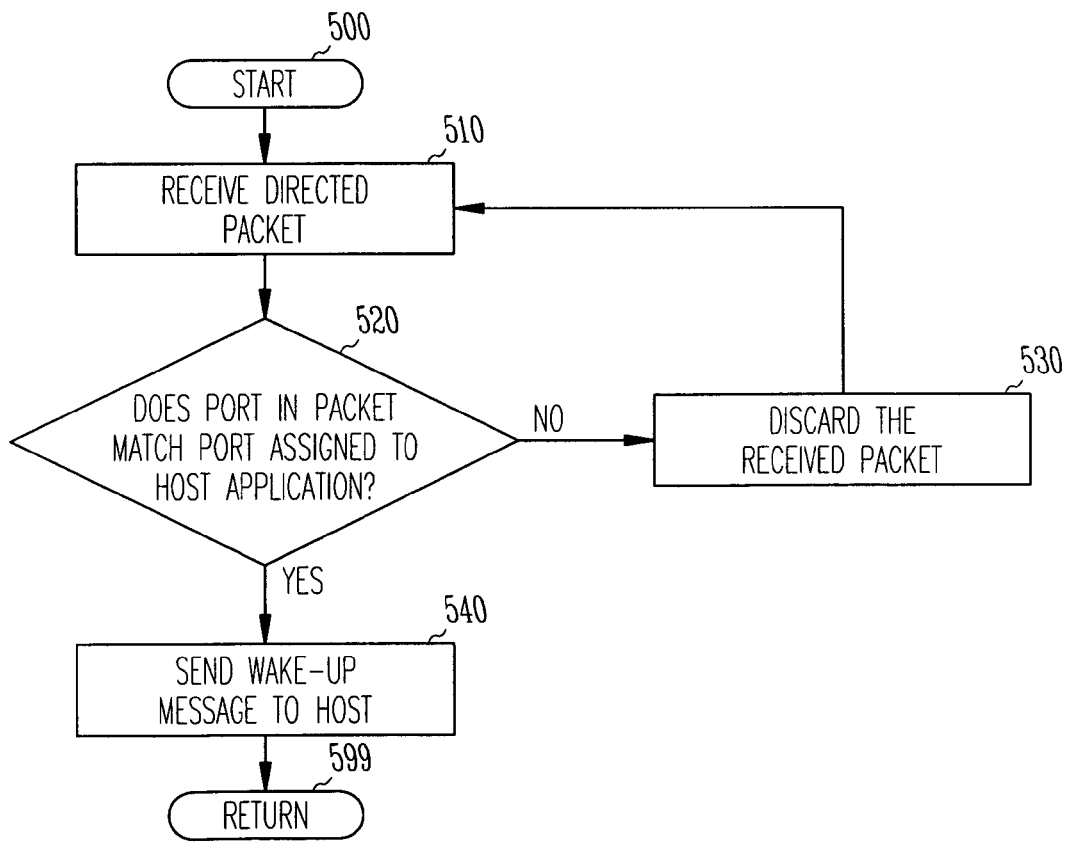
FIG. 5 depicts a flowchart that describes a method at a port filter, according to an embodiment of the invention.

FIG. 5 depicts a flowchart that describes a method at port filter 276, according to an embodiment of the invention. Control begins at block 500. Control then continues to block 510 where port filter 276 receives a directed packet from remote computer 188 via network 160, networking device 272, and pattern filter 274. Control then continues to block 520 where port filter 276 determines whether the port number in the received packet matches the port number assigned to an application executing on host computer 110. Port filter 276 carries out this determination using program information 264, which was previously loaded as described with reference to FIG. 4. Referring again to FIG. 5, if the determination at block 520 is false, then control continues to block 530 where port filter 276 discards the received packet. Control then returns to block 510, as previously described above.

If the determination at block 520 is true, then control continues to block 540 where port filter 276 sends a wake-up message to host computer 110. Control then continues to block 599 where the function returns.

What is claimed is:

1. A method of filtering packets from a network, the method comprising:

receiving a packet at a network adapter, the network adapter associated with a host computer in a power-managed state;

comparing a destination address of the received packet to an address of the host computer using a pattern filter of the network adapter to determine if the received packet is addressed to the host computer;

when the received packet is not addressed to the host computer, discarding the received packet;

when the received packet is addressed to the host computer, comparing a port identifier of the received packet to a port number assigned to an application executing on the host computer using a port filter of the network adapter;

when the received packet is addressed to the host computer and the port identifier does not match the port number, discarding the received packet using the port filter without waking up the host computer; and when the received packet is addressed to the host computer and the port identifier matches the port number, sending a wake-up message from the port filter to the host computer.

2. The method of claim 1, wherein the wake-up message causes the host computer to transition from the power-managed state to an operational state.

3. The method of claim 1, before receiving the packet, the method further comprises:

receiving program information from the host computer, the program information associated with a port in use by a particular process running on the host computer; and automatically configuring the port filter to filter packets based on the received program information.

4. The method of claim 3, wherein the program information comprises the port number.

5. The method of claim 1, before receiving the packet, the method further comprises:

receiving, at the port filter, program information from the host computer, the program information associated with a port in use by a particular process running on the host computer;

loading executable instructions from the received program information using the port filter; and processing the executable instructions using a processor of the port filter to configure the port filter to filter packets.

6. The method of claim 1, further comprising determining a protocol identifier associated with the received packet using the packet filter.

7. A computer-readable medium embodying instructions that, when executed by a processor, cause a network adapter to perform a method comprising:

receiving a packet at a port filter of the network adapter of a host system in a power-managed state;

when the packet is not addressed to the host system, discarding the packet;

when the packet is addressed to the host system, determining a port identifier of the packet;

when the port identifier of the packet matches a port number of one or more port numbers associated with a process running on the host system, sending a wake-up message from the port filter to the host computer; and when the port identifier does not match a port number of the one or more port numbers, discarding the packet using the port filter.

8. The computer-readable medium of claim 7, wherein the packet is discarded by the port filter without notifying the host system.

9. The computer-readable medium of claim 7, further embodying instructions that, when executed by the processor, cause the network adapter to perform the method further comprising:

identifying the port identifier within the received packet; and comparing the identified port number to the one or more port numbers to identify a match.

10. The computer-readable medium of claim 7, further embodying instructions that, when executed by the processor, cause the network adapter to perform the method further comprising, before receiving the packet at the port filter, receiving program information from the host computer.

11. The computer-readable medium of claim 10, wherein the program information includes criteria associated with processes running on the host computer.

12. The computer-readable medium of claim 11, further embodying instructions that, when executed by the processor, cause the network adapter to perform the method further comprising comparing the port identifier to the criteria specified in the program information to identify matches.

13. The computer-readable medium of claim 10, further embodying instructions that, when executed by the processor, cause the network adapter to perform the method further comprising storing the program information in a memory of the port filter.

14. A network adapter associated with a host computer to filter packets received from the network, the network adapter comprising:

a networking device coupled to a network to send and receive packets of information to and from the network;

a pattern filter coupled to the networking device and configured to interrogate packets of information received from the network to determine whether each packet is addressed to the host computer, the pattern filter to discard to discard or re-direct packets that are not addressed to the host computer without waking the host computer from a power-managed state; and a port filter coupled to the pattern filter to receive packets directed to the host computer, the port filter to determine whether each directed packet includes a port identifier that matches a port number associated with a process running on the host computer, the port filter to discard directed packets when there is no match, the port filter to send a wake-up signal to the host computer only when the port identifier matches the port number and the packet is addressed to the host computer.

15. The network adapter of claim 14, wherein the wake-up signal is configured to cause the host computer to transition from the power-managed state to an operational state to process the packet.

16. The network adapter of claim 14, wherein the port filter is configured to forward directed packets addressed to the host computer and including the port identifier that matches the port number to the host computer for processing.

17. The network adapter of claim 14, wherein the host computer includes the networking device, the pattern filter, and the port filter, and wherein the wake-up signal is sent from the port filter to a processor of the host computer.

18. The network adapter of claim 14, wherein the port filter is configured to receive program information from the host computer and to filter packets based on the received program information.

19. The network adapter of claim 18, wherein the program information includes instructions executable by the port filter to filter packets.

* * * * *